(12) United States Patent
Ahrens et al.

(10) Patent No.: US 12,399,846 B2
(45) Date of Patent: Aug. 26, 2025

(54) PHYSICAL ADJUSTMENT TO SYSTEM MEMORY WITH CHIPSET ATTACHED MEMORY

(71) Applicant: Advanced Micro Devices, Inc., Santa Clara, CA (US)

(72) Inventors: Jerry Anton Ahrens, Sister Bay, WI (US); William Robert Alverson, Del Valle, TX (US); Joshua Taylor Knight, Georgetown, TX (US); Amitabh Mehra, Fort Collins, CO (US); Anil Harwani, Austin, TX (US); Grant Evan Ley, Eden, UT (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/146,920

(22) Filed: Dec. 27, 2022

(65) Prior Publication Data
US 2024/0211416 A1    Jun. 27, 2024

(51) Int. Cl.
*G06F 13/16*    (2006.01)
(52) U.S. Cl.
CPC ...... *G06F 13/1668* (2013.01); *G06F 13/1626* (2013.01); *G06F 13/1642* (2013.01)
(58) Field of Classification Search
CPC ............. G06F 13/1626; G06F 13/1642; G06F 13/1668; G06F 3/0601; G06F 3/0607; G06F 3/0635; G06F 3/0673; G06F 3/0646
See application file for complete search history.

(56) References Cited

U.S. PATENT DOCUMENTS

| | | | |
|---|---|---|---|
| 6,295,591 B1 * | 9/2001 | Bealkowski | G11C 29/74 711/2 |
| 6,467,048 B1 | 10/2002 | Olarig et al. | |
| 6,714,891 B2 | 3/2004 | Dendinger | |
| 9,886,987 B1 | 2/2018 | Brahmadathan et al. | |
| 10,691,570 B1 | 6/2020 | Lui et al. | |
| 11,262,924 B2 | 3/2022 | Alverson et al. | |
| 11,493,389 B2 | 11/2022 | Horng et al. | |

(Continued)

FOREIGN PATENT DOCUMENTS

| | | |
|---|---|---|
| CN | 114780473 A | 7/2022 |
| WO | 2024144870 A1 | 7/2024 |

OTHER PUBLICATIONS

U.S. Appl. No. 16/711,875, "Final Office Action", U.S. Appl. No. 16/711,875, filed Sep. 2, 2021, 17 pages.

(Continued)

*Primary Examiner* — Tracy A Warren
(74) *Attorney, Agent, or Firm* — FIG. 1 Patents

(57) ABSTRACT

Physical adjustment to system memory with chipset attached memory is described. In accordance with the described techniques, an indication for making one or more physical adjustments to system memory of a device is received. Contents of the system memory are transferred via a chipset link to a chipset attached memory. The device is operated using the contents from the chipset attached memory while the one or more physical adjustments are made to adjust the system memory. After the one or more physical adjustments, the contents are transferred back from the chipset attached memory to the adjusted system memory via the chipset link.

19 Claims, 5 Drawing Sheets

(56) References Cited

U.S. PATENT DOCUMENTS

| | | | |
|---|---|---|---|
| 11,720,266 B2 | 8/2023 | Alverson et al. | |
| 11,740,944 B2 | 8/2023 | Mehra et al. | |
| 2002/0010875 A1* | 1/2002 | Johnson | G06F 11/108 |
| | | | 711/115 |
| 2002/0129186 A1* | 9/2002 | Emerson | G06F 13/4081 |
| | | | 710/302 |
| 2003/0074591 A1 | 4/2003 | Mcclendon et al. | |
| 2003/0154428 A1 | 8/2003 | Pelner | |
| 2003/0206050 A1 | 11/2003 | Huard et al. | |
| 2003/0208650 A1* | 11/2003 | Depew | G06F 11/1666 |
| | | | 710/302 |
| 2003/0208654 A1* | 11/2003 | Krontz | G06F 11/1666 |
| | | | 710/312 |
| 2004/0133756 A1* | 7/2004 | Shaw | G06F 12/08 |
| | | | 711/163 |
| 2004/0153723 A1* | 8/2004 | Depew | G06F 11/1666 |
| | | | 714/6.11 |
| 2005/0283561 A1 | 12/2005 | Lee et al. | |
| 2006/0136763 A1 | 6/2006 | Jorgenson et al. | |
| 2006/0161375 A1 | 7/2006 | Duberstein et al. | |
| 2008/0028236 A1 | 1/2008 | Capps et al. | |
| 2008/0317086 A1 | 12/2008 | Santos et al. | |
| 2009/0150660 A1 | 6/2009 | Yao et al. | |
| 2010/0131221 A1 | 5/2010 | Chien | |
| 2011/0131400 A1 | 6/2011 | Chiu et al. | |
| 2013/0205130 A1 | 8/2013 | Hallowell et al. | |
| 2013/0262728 A1 | 10/2013 | Wong | |
| 2014/0032949 A1 | 1/2014 | Kim et al. | |
| 2014/0159806 A1 | 6/2014 | Kim et al. | |
| 2015/0063420 A1 | 3/2015 | Cho et al. | |
| 2015/0242154 A1* | 8/2015 | Yang | G06F 11/1658 |
| | | | 711/115 |
| 2015/0378745 A1 | 12/2015 | He et al. | |
| 2016/0011802 A1 | 1/2016 | Berke | |
| 2016/0179643 A1* | 6/2016 | Sun | G06F 11/1461 |
| | | | 711/115 |
| 2017/0160956 A1 | 6/2017 | Chinnakkonda et al. | |
| 2018/0088638 A1 | 3/2018 | Nguyen et al. | |
| 2018/0107591 A1 | 4/2018 | Smith | |
| 2018/0217005 A1 | 8/2018 | Kanodia | |
| 2018/0253317 A1 | 9/2018 | Pan et al. | |
| 2019/0310947 A1 | 10/2019 | Raisch et al. | |
| 2019/0369683 A1 | 12/2019 | Vishnubhatla et al. | |
| 2020/0065022 A1 | 2/2020 | Itagaki et al. | |
| 2021/0089461 A1 | 3/2021 | Choi et al. | |
| 2021/0182121 A1 | 6/2021 | Mehra et al. | |
| 2021/0255966 A1 | 8/2021 | Chen et al. | |
| 2021/0326232 A1 | 10/2021 | Partiwala et al. | |
| 2021/0349730 A1 | 11/2021 | Lee et al. | |
| 2022/0155982 A1 | 5/2022 | Alverson et al. | |
| 2022/0357855 A1 | 11/2022 | Narasingarayanapeta et al. | |
| 2023/0418590 A1* | 12/2023 | Gunyuzlu | G06F 21/575 |
| 2024/0211160 A1 | 6/2024 | Ahrens et al. | |
| 2024/0319712 A1 | 9/2024 | Ahrens et al. | |
| 2024/0319903 A1 | 9/2024 | Alverson et al. | |
| 2024/0330076 A1 | 10/2024 | Ahrens et al. | |
| 2024/0330134 A1 | 10/2024 | Ahrens et al. | |

OTHER PUBLICATIONS

U.S. Appl. No. 16/711,875 , "Final Office Action", U.S. Appl. No. 16/711,875, filed Oct. 27, 2022, 17 pages.

U.S. Appl. No. 16/711,875 , "Non-Final Office Action", U.S. Appl. No. 16/711,875, filed Jan. 25, 2021, 16 pages.

U.S. Appl. No. 16/711,875 , "Non-Final Office Action", U.S. Appl. No. 16/711,875, filed Feb. 17, 2022, 16 pages.

U.S. Appl. No. 17/591,924 , "Non-Final Office Action", U.S. Appl. No. 17/591,924, filed Oct. 20, 2022, 12 pages.

Ahrens, Jerry Anton, et al., U.S. Appl. No. 18/146,929, filed Dec. 27, 2022, 42 pages.

U.S. Appl. No. 16/711,875 , "Corrected Notice of Allowability", U.S. Appl. No. 16/711,875, filed Apr. 27, 2023, 2 pages.

U.S. Appl. No. 16/711,875 , "Notice of Allowance", U.S. Appl. No. 16/711,875, filed Apr. 14, 2023, 5 pages.

U.S. Appl. No. 17/591,924 , "Notice of Allowance", U.S. Appl. No. 17/591,924, filed Mar. 15, 2023, 5 pages.

Ahrens, Jerry Anton, et al., U.S. Appl. No. 18/187,848, filed Mar. 22, 2023, 44 pages.

Ahrens, Jerry Anton, et al., U.S. Appl. No. 18/190,664, filed Mar. 27, 2023, 37 pages.

Ahrens, Jerry Anton, et al., U.S. Appl. No. 18/190,521, filed Mar. 27, 2023, 45 pages.

Alverson, William Robert, et al., U.S. Appl. No. 18/187,900, filed Mar. 22, 2023, 59 pages.

U.S. Appl. No. 16/711,875 , "Corrected Notice of Allowability", U.S. Appl. No. 16/711,875, filed Jun. 8, 2023, 4 pages.

U.S. Appl. No. 18/187,900, "Non-Final Office Action", U.S. Appl. No. 18/187,900, filed Aug. 12, 2024, 10 pages.

U.S. Appl. No. 18/146,929, "Non-Final Office Action", U.S. Appl. No. 18/146,929, filed Mar. 28, 2024, 24 pages.

PCT/US2023/036376 , "International Seach Report and Written Opinion", PCT Application No. PCT/US2023/036376, Feb. 29, 2024, 8 pages.

U.S. Appl. No. 18/146,929, "FInal Office Action", U.S. Appl. No. 18/146,929, filed Oct. 23, 2024, 26 pages.

U.S. Appl. No. 18/187,900, "Final Office Action", U.S. Appl. No. 18/187,900, filed Dec. 4, 2024, 12 pages.

U.S. Appl. No. 18/190,664, "Non-Final Office Action", U.S. Appl. No. 18/190,664, filed Nov. 13, 2024, 13 pages.

"Non-Final Office Action", U.S. Appl. No. 18/187,900, Mar. 13, 2025, 11 pages.

"Final Office Action", U.S. Appl. No. 18/190,664, Feb. 26, 2025, 13 pages.

"Non-Final Office Action", U.S. Appl. No. 18/187,848, Jun. 26, 2025, 20 pages.

"Non-Final Office Action", U.S. Appl. No. 18/190,664, Jun. 24, 2025, 14 pages.

* cited by examiner

PHYSICAL ADJUSTMENT TO SYSTEM MEMORY WITH CHIPSET ATTACHED MEMORY

BACKGROUND

Computer games and other applications are regularly advancing, resulting in larger programs, higher resolution graphics, new features, and so forth. To address these advances, computer hardware is also advancing to provide new types of memory having faster data rates, faster clock rates, and so forth.

DETAILED DESCRIPTION

Overview

Figure 1:
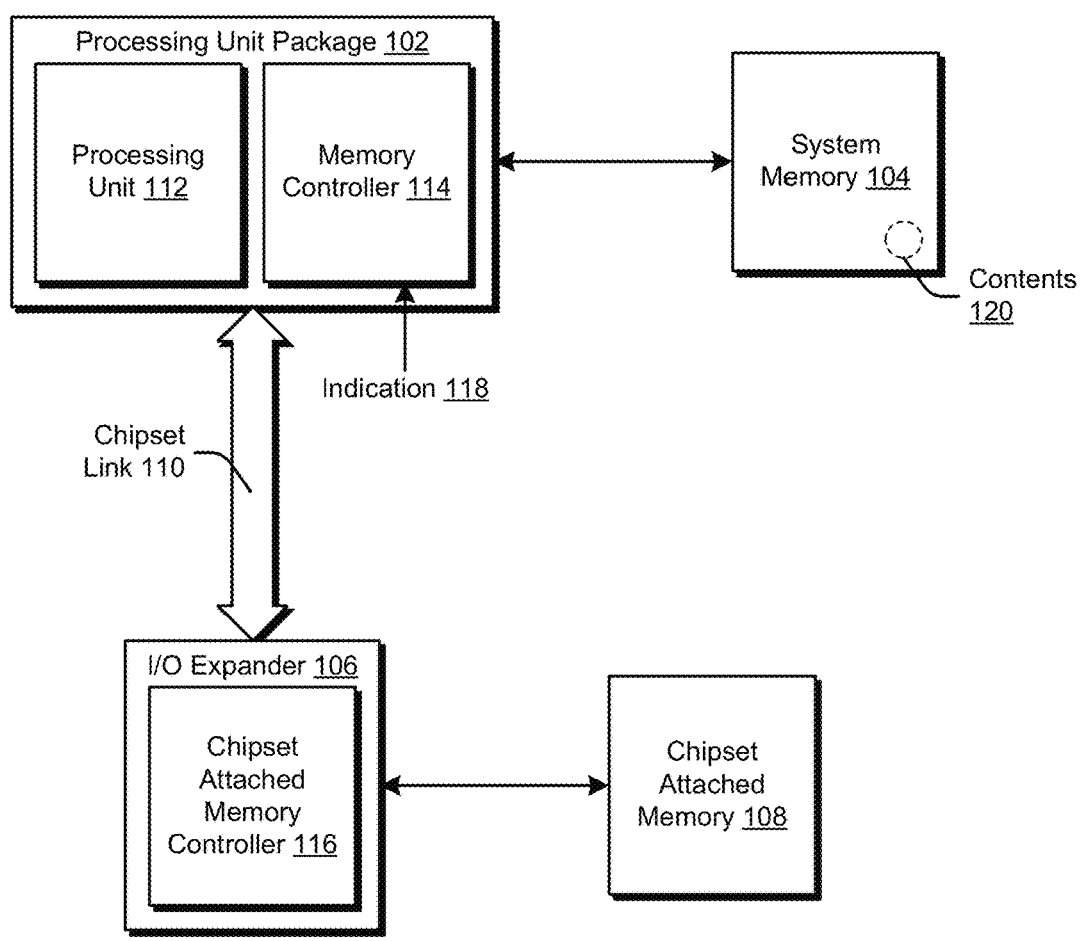
FIG. 1 is an illustration of a non-limiting example system that employs a chipset attached memory to continue operation of the system during physical adjustment of system memory.

Physical adjustment to system memory with chipset attached memory is described. In accordance with the described techniques, a computing system uses a chipset attached memory to continue operating while adjustments, e.g., physical adjustments, are made to a system memory. For example, the system uses the chipset attached memory to continue running an operating system while the system memory is inoperable. To do so, the system memory is disabled (e.g., by gating the system memory so that the system memory is powered down and "offline") which enables the system memory to be physically adjusted. Examples of such physical adjustments which can occur while the system memory is inoperable include, but are not limited to, removing, adding, or swapping one or more components of the system memory, such as a dual in-line memory module (DIMM), a small-outline dual in-line memory module (SO-DIMM), or a registered dual in-line memory module (RDIMM).

In one or more implementations, contents of the system memory are transferred to the chipset attached memory. This transfer may occur, for example, responsive to a user request made via a user interface of the system. Once the contents are transferred to the chipset attached memory, various operations are performed using the contents which are now available for access in the chipset attached memory. For example, a processing unit of the system is able to execute (and/or continues to seamlessly execute) one or more tasks of an operating system and/or an application using the contents from the chipset attached memory. Notably, the processing unit uses the same contents that were in the main system memory but are now available transparently to the operating system or application in the chipset attached memory While such operations are performed using the contents from the chipset attached memory, the system memory is disabled and inoperable. As such, physical adjustments can be made to the system memory because the system memory is not in use, e.g., power to the system memory is gated or otherwise cut. Cutting power to the system memory (and other components), enables the system memory to be physically handled (e.g., touched) safely, such as by adding one or more components (e.g., a DIMM, SODIMM, or RDIMM) to the system memory, removing one or more components from the system memory, and/or swapping one or more components of the system memory. After physical adjustments are made to the system memory, the contents are transferred back from the chipset attached memory to the adjusted system memory. Once the contents are transferred back to the system memory, the processing unit executes (and/or continues executing) one or more tasks of an operating system and/or an application using the contents from the system memory.

The ability to continue to operate by performing memory-based tasks while the system memory is inoperable and being physically adjusted contrasts with conventional techniques. For example, rather than continuing to run an operating system or an application on a processing unit while system memory is physically adjusted, conventional techniques also power down the processing unit (and/or the system altogether) so that the system memory can be physically adjusted in a safe manner. By continuing to operate using the chipset attached memory, however, the described techniques enable memory-based tasks to continue being performed during physical adjustments to the system memory. As a result, "down time" of the system is reduced and/or eliminated, which reduces interruptions to various tasks (e.g., background tasks) and improves the user experience.

In some aspects, the techniques described herein relate to an apparatus including: a system memory, a memory controller configured to provide a transfer request to the system memory to cause contents maintained by the system memory to be transferred from the system memory to a chipset attached memory, and a processing unit to execute one or more tasks using the contents from the chipset attached memory.

In some aspects, the techniques described herein relate to an apparatus, further including a processing unit package that includes the processing unit and the memory controller, wherein the system memory is coupled to the processing unit package.

In some aspects, the techniques described herein relate to an apparatus, further including a chipset link coupling the processing unit package to the chipset attached memory, wherein the contents is transferred from the system memory to the chipset attached memory via the chipset link.

In some aspects, the techniques described herein relate to an apparatus, wherein the system memory is inoperable while the processing unit executes the one or more tasks using the contents from the chipset attached memory.

In some aspects, the techniques described herein relate to an apparatus, wherein power to the system memory is gated while the processing unit executes the one or more tasks using the contents from the chipset attached memory.

In some aspects, the techniques described herein relate to an apparatus, wherein gating the system memory enables one or more physical adjustments to be made to the system memory while the processing unit executes the one or more tasks using the contents from the chipset attached memory, wherein the one or more physical adjustments that can be made to the system memory include one or more of swapping a physical component of the system memory, removing a physical component of the physical memory, or replacing a physical component of the physical memory. 7.

In some aspects, the techniques described herein relate to an apparatus, wherein the physical memory module includes a dual in-line memory module.

In some aspects, the techniques described herein relate to an apparatus, wherein the memory controller is further configured to provide an additional transfer request to the chipset attached memory to cause the contents to be transferred back from the chipset attached memory to the system memory.

In some aspects, the techniques described herein relate to an apparatus, wherein the memory controller is configured to provide the transfer request responsive to receiving an indication that one or more physical adjustments are going to be made to the system memory.

In some aspects, the techniques described herein relate to a method including: receiving an indication for making one or more physical adjustments to system memory of a device, transferring, via a chipset link, contents of the system memory to a chipset attached memory, operating the device using the contents from the chipset attached memory while the one or more physical adjustments are made to adjust the system memory, and after the one or more physical adjustments, transferring, via the chipset link, the contents back from the chipset attached memory to the adjusted system memory.

In some aspects, the techniques described herein relate to a method, further including cutting power to the system memory while the one or more physical adjustments are made to adjust the system memory.

In some aspects, the techniques described herein relate to a method, further including operating the device using the contents from the adjusted system memory after the contents are transferred back from the chipset attached memory.

In some aspects, the techniques described herein relate to a method, further including operating the device using the contents from the system memory before the contents are transferred to the chipset attached memory.

In some aspects, the techniques described herein relate to a method, wherein the one or more physical adjustments include one or more of swapping a physical component of the system memory, removing a physical component of the physical memory, or replacing a physical component of the physical memory.

In some aspects, the techniques described herein relate to a method, wherein the physical component includes a physical memory module.

In some aspects, the techniques described herein relate to a method, wherein the physical memory module includes a dual in-line memory module.

In some aspects, the techniques described herein relate to a method, further including training the adjusted physical memory before transferring the contents back from the chipset attached memory to the adjusted system memory.

In some aspects, the techniques described herein relate to a system including: system memory slots into which system memory is installable, a chipset attached memory, a memory controller configured to cause contents stored in the system memory to be transferred to the chipset attached memory, and a processing unit configured to execute one or more tasks using the contents from the chipset attached memory while one or more system memory components are added or removed from one or more of the system memory slots.

In some aspects, the techniques described herein relate to a system, wherein the one or more system memory components include one or more physical memory modules.

In some aspects, the techniques described herein relate to a system, wherein the one or more system memory components include one or more dual in-line memory modules.

FIG. 1 is an illustration of a non-limiting example system 100 that employs a chipset attached memory to continue operation of the system during physical adjustment of system memory. The system 100 includes a processing unit package 102, a system memory 104, an I/O expander 106, a chipset attached memory 108, and a chipset link 110. The processing unit package 102, the system memory 104, the I/O expander 106, the chipset attached memory 108, and the chipset link 110 are installed on or are part of, for example, a motherboard or other printed circuit board. In one or more implementations, the I/O expander 106 (including the chipset attached memory controller 116), the chipset link 110, one or more memory channels between the processing unit package 102 and the system memory 104, and one or more memory channels between the I/O expander 106 and the chipset attached memory 108 are also referred to as a chipset of a motherboard or other printed circuit board. In one or more variations, the chipset link 110 could be routed entirely on the motherboard itself. In one or more other variation, the I/O expander 106 (including the chipset attached memory controller 116) and the chipset attached memory 108 could be implemented on an add-in card that is connected to the motherboard via a socket.

The processing unit package 102 includes a processing unit 112 and a memory controller 114. The processing unit 112 is any of various processing units, such as a central processing unit (CPU), a graphics processing unit (GPU), an Accelerated Processing Unit (APU), a parallel accelerated processor, a digital signal processor, an artificial intelligence (AI) or machine learning accelerator, and so forth. Although a single processing unit 112 is illustrated in the system 100, the processing unit package 102 optionally includes any number of processing units of the same or different types.

The system memory 104 is any of a variety of types of physical RAM. Examples of system memory 104 include dynamic random-access memory (DRAM), phase-change memory (PCM), memristors, static random-access memory (SRAM), and so forth. The system memory 104 is coupled or attached to the processing unit package 102 via one or more memory channels. The system memory 104 is packaged or configured in any of a variety of different manners. Examples of such packaging or configuring include a dual in-line memory module (DIMM), a small-outline DIMM (SO-DIMM), a registered dual in-line memory module (RDIMM), a non-volatile DIMM (NVDIMM), a ball grid array (BGA) memory permanently attached to (e.g., soldered to) the motherboard (or other printed circuit board), and so forth.

Examples of types of DIMMs include, but are not limited to, synchronous dynamic random-access memory (SDRAM), double data rate (DDR) SDRAM, double data rate 2 (DDR2) SDRAM, double data rate 3 (DDR3) SDRAM, double data rate 4 (DDR4) SDRAM, and double data rate 5 (DDR5) SDRAM. In at least one variation, the system memory 104 is configured as or includes a SO-DIMM or an RDIMM according to one of the above-mentioned standards, e.g., DDR, DDR2, DDR3, DDR4, and DDR5.

Further examples of memory configurations include low-power double data rate (LPDDR), also known as LPDDR SDRAM, which is a type of synchronous dynamic random-access memory. In variations, LPDDR consumes less power than other types of memory and/or has a form factor suitable for mobile computers and devices, such as mobile phones. Examples of LPDDR include, but are not limited to, low-power double data rate 2 (LPDDR2), low-power double data rate 3 (LPDDR3), low-power double data rate 4 (LPDDR4), and low-power double data rate 5 (LPDDR5). It is to be appreciated that the System memory 104 is configurable in a variety of ways without departing from the spirit or scope of the described techniques.

The memory controller 114 manages access to the system memory 104, such as by sending read and write requests to the system memory 104 and receiving responses from the system memory 104. In one or more implementations, the system memory 104 is physical memory managed by an operating system running on the processing unit 112 (e.g., a CPU), such as by allocating portions of the system memory 104 to applications running on the processing unit 112, managing virtual memory spaces and memory pages for applications running on the processing unit 112, and so forth.

The processing unit package 102 optionally includes one or more additional controllers to link to additional devices, such as a Peripheral Component Interconnect Express (PCIe) controller, a Serial Advanced Technology Attachment (SATA) controller, a Universal Serial Bus (USB) controller, a Serial Peripheral Interface (SPI) controller, a Low Pin Count (LPC) controller, and so forth. Additionally or alternatively, one or more of these additional controllers is implemented separate from the processing unit package 102, such as in a chip (e.g., an integrated circuit optionally referred to as a northbridge) that is part of the chipset of a motherboard or other printed circuit board.

The processing unit package 102 communicates with the I/O expander 106 via the chipset link 110. The chipset link 110 is any of a variety of communication links, such as a high-speed bus. In one example, the chipset link 110 is one or more PCIe lanes.

The I/O expander 106 includes a chipset attached memory controller 116. The I/O expander 106 optionally includes or is coupled to one or more additional controllers to link to other devices, such as a PCIe controller, a SATA controller, a USB controller, an SPI controller, an LPC controller, and so forth. In one or more implementations, the I/O expander 106 is referred to as a southbridge.

The chipset attached memory controller 116 manages access to the chipset attached memory 108, such as by sending read and write requests to the chipset attached memory 108 and receiving responses from the chipset attached memory 108. The chipset attached memory 108 is referred to as "chipset attached" due to the chipset attached memory 108 being attached to the I/O expander 106 rather than the processing unit package 102 directly, and due to the chipset attached memory 108 being controlled by a memory controller of the I/O expander 106 rather than a memory controller of the processing unit package 102. The chipset attached memory 108 is coupled or attached to the I/O expander 106 via one or more memory channels.

The chipset attached memory 108 is physical memory managed by an application or program other than an operating system running on the processing unit 112. The chipset attached memory 108 is separate from the system memory 104, allowing the chipset attached memory to be used in various manners, such as to speed up access to frequently used data, without reducing the amount of system memory 104 available to an operating system running on the processing unit 112.

The chipset attached memory 108 is any of a variety of types of physical memory. Examples of chipset attached memory 108 include random-access memory (RAM), such as DRAM, PCM, memristors, SRAM, and so forth. The chipset attached memory 108 is volatile memory or non-volatile memory. The chipset attached memory 108 is packaged or configured in any of a variety of different manners. Examples of such packaging or configuring include a DIMM, a SO-DIMM, an RDIMM, an NVDIMM, a BGA, a 3-dimensional (3D) stacked memory, on-package memory (e.g., memory included in the I/O expander 106), memory permanently attached to (e.g., soldered to) the motherboard, and so forth.

As noted above, examples of types of DIMMs include, but are not limited to, SDRAM, DDR SDRAM, DDR2 SDRAM, DDR3 SDRAM, DDR4 SDRAM, and DDR5 SDRAM. In at least one variation, the chipset attached memory 108 is configured as or includes a SO-DIMM or an RDIMM according to one of the above-mentioned standards, e.g., DDR, DDR2, DDR3, DDR4, and DDR5. Further examples of chipset attached memory configurations include LPDDR, such as LPDDR2, LPDDR3, LPDDR4, and LPDDR5. It is to be appreciated that the chipset attached memory 108 is configurable in a variety of ways without departing from the spirit or scope of the described techniques.

In accordance with the described techniques, the system 100 uses the chipset attached memory 108 to continue operating while adjustments, e.g., physical adjustments, are made to the system memory 104. For example, the system 100 uses the chipset attached memory 108 to continue running an operating system while the system memory 104 is being physically adjusted and is thus powered down and "offline." Examples of such physical adjustments include, but are not limited to, removing the system memory 104 (or one or more components of the system memory 104, such as a DIMM, a SODIMM, or an RDIMM), swapping the system memory 104 (or components of the system memory 104, such as DIMMs, SODIMMs, or RDIMMs), replacing the system memory 104 (or one or more components of the system memory 104, such as a DIMM, a SODIMM, or an RDIMM), and adding to the system memory 104 (e.g., adding one or more components, such as a DIMM, SODIMM, or RDIMM).

In one or more implementations, an indication 118 for making physical adjustments to the system memory 104 is received. By way of example, a user provides an input via a user interface of a system- or memory-management application (not shown), being executed by the processing unit 112, and the input indicates that the user intends to physically adjust the system memory 104. This enables the system 100 to transition to a state where a person can physically adjust the system memory 104 without endangering himself or herself and without damaging components of the system 100. If power is not cut to the system memory 104, for instance, a person attempting to physically adjust the system memory 104 risks being electrically shocked, which can cause a variety of adverse outcomes and can be fatal in some circumstances.

In the illustrated example, the memory controller 114 is depicted receiving the indication 118 for making the physical adjustments. In one or more implementations, the indication 118 is received from an operating system and/or an application, e.g., executing on the processing unit 112 or portions of which execute on the processing unit 112. In at least one variation, the indication 118 is received from another component of the system 100 or from a different component (not shown) coupled to the system 100. Additionally, in one or more scenarios, the indication 118 is not received based on user input—the indication 118 is received based on a different trigger.

In accordance with the described techniques, contents 120 of the system memory 104 are transferred via the chipset link 110 to the chipset attached memory 108. Based on or responsive to receipt of the indication 118, for instance, the memory controller 114 causes the contents 120 of the system memory 104 to be transferred via the chipset link 110 to the chipset attached memory 108.

Once the contents 120 are transferred to the chipset attached memory 108, various operations are performed using the contents 120 from the chipset attached memory 108. For example, the processing unit 112 executes (and/or continues to execute) one or more tasks of an operating system and/or an application using the contents 120 from the chipset attached memory 108. Such tasks are performed using the contents 120 from the chipset attached memory 108 rather than using the contents 120 from the system memory 104. While such operations are performed using the contents 120 from the chipset attached memory 108, physical adjustments can be made to the system memory 104 because the system memory 104 is not in use, e.g., power to the system memory 104 is gated or otherwise cut. In one or more implementations, one or more components of the system 100 perform one or more actions in addition to cutting power to the system memory 104 to enable safe physical modification of the system memory 104 and/or portions of the system memory. By cutting power to the system memory 104 (and other components), the system 100 enables the system memory 104 to be physically handled (e.g., touched) safely, so that one or more components (e.g., a DIMM, SODIMM, or RDIMM) can be added to the system memory 104, one or more components can be removed from the system memory 104, and/or one or more components of the system memory 104 can be swapped.

Continuing to operate by performing memory-based tasks while the system memory 104 is being physically adjusted, contrasts with conventional techniques. Rather than continuing to run an operating system or an application on a processing unit while system memory is physically adjusted, conventional techniques also power down the processing unit (and/or the system 100 altogether) so that the system memory can be physically adjusted in a safe manner. By continuing to operate using the chipset attached memory 108, the described techniques enable memory-based tasks to continue being performed (which keeps operating systems, applications, and so on running) during physical adjustments to the system memory 104. As a result, "down time" of the system 100 is reduced and/or eliminated, which reduces interruptions to various tasks (e.g., background tasks) and improves a user experience.

After physical adjustments are made to the system memory 104, the contents 120 are transferred back from the chipset attached memory 108 to the system memory 104 via the system memory 104, which has been adjusted. In one or more implementations, prior to transferring the contents 120 back to the system memory 104, the new physical configuration of the system memory (e.g., with new DIMMs) is trained and brought back online and then the active contents 120 in the chipset attached memory 108 are transferred back to the system memory 104. Once the contents 120 are transferred back to the system memory 104, various operations are performed using the contents 120 from the system memory 104 as adjusted—rather than performing the operations using the contents 120 from the chipset attached memory 108. For example, the processing unit 112 executes (and/or resumes executing) one or more tasks of an operating system and/or an application using the contents 120 from the system memory 104.

Thus, in one or more scenarios, the processing unit 112 operates using the contents 120 from the system memory 104, e.g., before the contents 120 are transferred to the chipset attached memory 108. The contents 120 are then transferred from the system memory 104 to the chipset attached memory 108 via the chipset link 110. The processing unit 112 subsequently operates (or continues to operate) using the contents 120 from the chipset attached memory 108, e.g., while the system memory 104 is being physically adjusted. The contents 120 are transferred from the chipset attached memory 108 to the system memory 104 via the chipset link 110, e.g., after the physical adjustments to the system memory 104. The processing unit 112 subsequently operates (or continues to operate) using the contents 120 from the system memory 104.

In one or more implementations, the system 100 outputs one or more indications when it is safe for a user to physically adjust the system memory 104. After the contents 120 are transferred to the chipset attached memory 108 and operation of the system 100 continues using the contents 120 from the chipset attached memory 108, for instance, the system 100 may output one or more visual or haptic indicators. By way of example, and not limitation, the system 100 may output a signal (e.g., flash, change color, strobe, turn on, turn off, etc.) via a light emitting diode (LED) on a component (e.g., the processing unit package 102 or near a socket for the system memory 104), output one or more sounds via a speaker (e.g., beeps, chimes, etc.), output a haptic signal (e.g., a vibration) via one or more components, and so on. Alternately or in addition, a system- or memory-management application (not shown) operating on the processing unit 112 outputs a notification via a user interface indicating that it is safe for a user to physically adjust the system memory 104, which is possible because the operations of the system are continued using the contents 120 from the chipset attached memory 108. In one or more implementations, a notification may be output via one or more devices connected to the system 100. For example, the notification may be communicated from the system 100 to the device via a wireless connection. By way of example and not limitation, the notification may be communicated from the system 100 to the device via a Bluetooth connection, via a Wi-Fi connection, or via the Internet (e.g., as an email message). The device connected to the system may then output the notification, e.g., via a user interface of an application associated with the system 100. One or more of these various indications inform a user when it is safe to physically adjust the system memory 104, and thereby reducing or eliminating adverse outcomes that can result from handling system memory at a wrong time.

The system 100 is implementable in a device or apparatus. Examples of the different types of devices or apparatuses in which the system 100 can be implemented include, by way of example and not limitation, a personal computer (e.g., a desktop or tower computer), a smartphone or other wireless phone, a tablet or phablet computer, a notebook computer, a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television, a set-top box), an Internet of Things (IoT) device, an automotive computer, and so forth.

Figure 2:
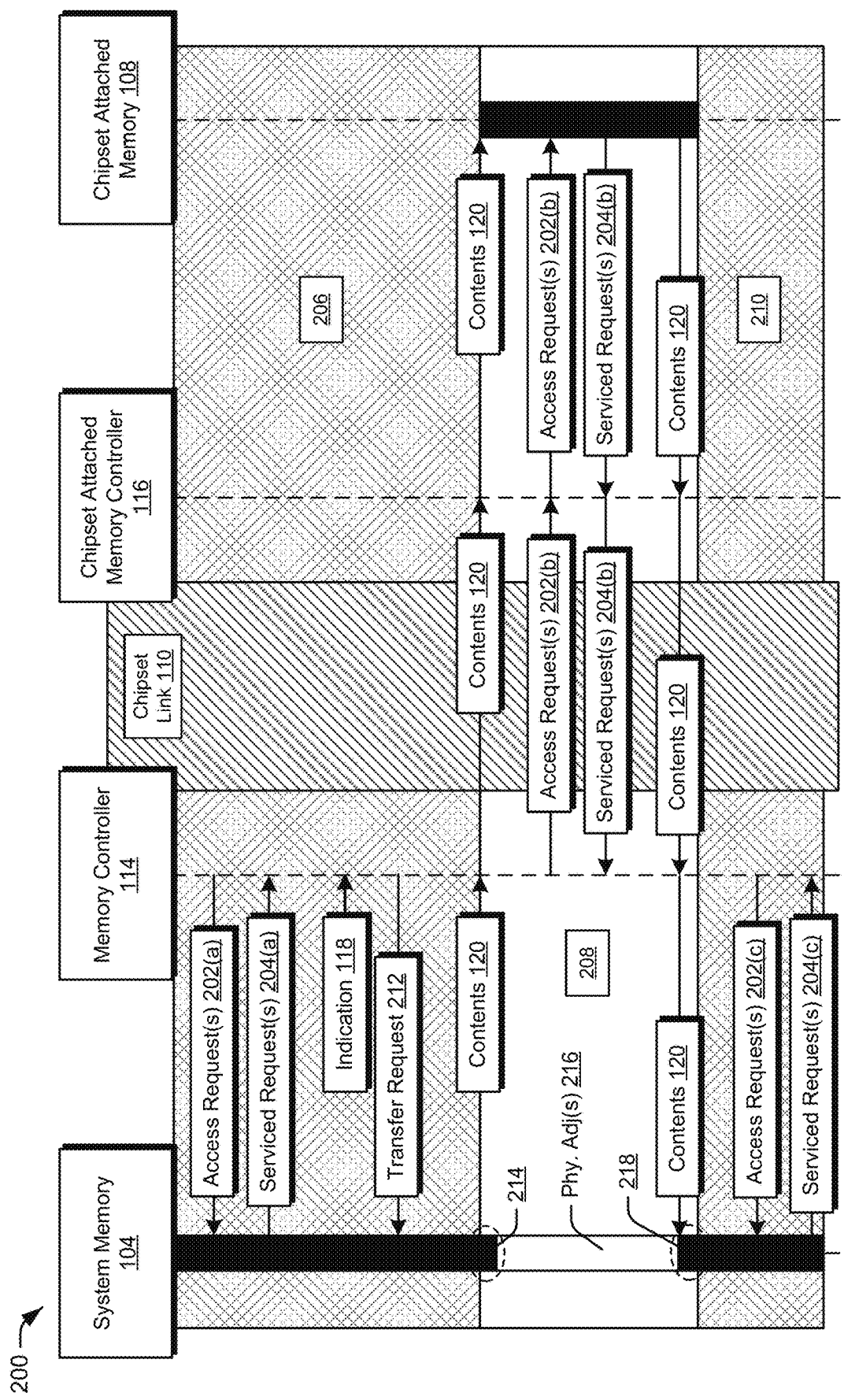
FIG. 2 depicts a non-limiting example in which chipset attached memory continues operation of a system during physical adjustment of system memory.

FIG. 2 depicts a non-limiting example 200 in which chipset attached memory continues operation of a system during physical adjustment of system memory. The example 200 includes the system memory 104, the memory controller 114, the chipset link 110, the chipset attached memory controller 116, and the chipset attached memory 108.

The example 200 includes a variety of example communications and operations between the system memory 104, the memory controller 114, the chipset link 110, the chipset attached memory controller 116, and the chipset attached memory 108 over time. In this example 200, the communications and operations are positioned vertically based on time, such that communications and operations closer to a top of the example occur prior to communications or operations further from the top of the example. It follows also that communications or operations closer to a bottom of the example occur subsequent to communications or operations further from the bottom. The example 200 also depicts various phases and/or states of the system 100 or portions of the system 100. These phases and/or states are also positioned in the example 200 vertically based on time, such that phases or states closer to a top of the example occur prior to phases, states, or communications further from the top.

Here, the illustrated example 200 depicts the system memory 104 receiving one or more access requests 202(a) (e.g., read and/or write requests) from the memory controller 114. The illustrated example 200 also depicts the memory controller 114 receiving one or more serviced requests 204(a) from the system memory 104. Where an access request 202(a) corresponds to a read request, for instance, the respective serviced request 204(a) includes or otherwise indicates data of one or more memory addresses associated with the access request 202(a). In contrast, where an access request 202(a) corresponds to a write request, the respective serviced request 204(a) involves updating the system memory 104 at one or more memory addresses associated with the write request to maintain one or more indicated values.

Transmission of the access requests 202(a) and the servicing of them (e.g., as indicated by the serviced requests 204(a)) by the memory controller 114 and the system memory 104 represents a first phase 206 of operation of a device (and/or the system 100), which uses the contents 120 from the system memory 104. Transmission of the access requests 202(b) and the servicing of them (e.g., as indicated by the serviced requests 204(b)) between the memory controller 114, the chipset attached memory controller 116, and the chipset attached memory 108 represents a second phase 208 of operation of the device (and/or the system 100), which uses the contents 120 from the chipset attached memory 108. The subsequent transmission of the access requests 202(c) and the servicing of them (e.g., as indicated by the serviced requests 204(c)) by the memory controller 114 and the system memory 104 represents a third phase 210 of operation of the device (and/or the system 100), which uses the contents 120 from the system memory 104.

In this example 200, the memory controller 114 is depicted receiving the indication 118 at a point in time during the first phase 206 of operation. It is to be appreciated that, in various scenarios, the indication 118 is received interleaved with transmission of one or more access requests 202(a) and indications of serviced requests 204(a). As noted above, in one or more implementations, the indication 118 is received based on user input, e.g., received via a user interface and indicating that physical adjustments are going to be made to the system memory 104.

In one or more implementations, the memory controller 114 provides a transfer request 212 to the system memory 104 (e.g., one or more write requests), e.g., for transferring contents 120 maintained by the system memory 104 to the chipset attached memory 108. In variations, the contents 120 transferred ranges from a subset of data maintained in the system memory 104 to an entirety of the data maintained in the system memory 104. In terms of data flow, the contents 120 are transferred from the system memory 104 (e.g., over one or more memory interfaces) to the memory controller 114, which communicates the contents 120 over the chipset link 110 to the chipset attached memory controller 116 (e.g., of the I/O expander 106), and the chipset attached memory controller 116 communicates the contents 120 to the chipset attached memory 108 (e.g., over one or more memory interfaces), where the contents are stored. In one or more implementations, the chipset attached memory controller 116 stores the contents 120 in the chipset attached memory 108 using one or more write requests.

After the contents are transferred, operation of the device (and/or the system 100) uses the contents 120 from the chipset attached memory 108. This example 200 depicts overlap 214 between when chipset attached memory 108 includes the contents 120, such that the system 100 is operable using the contents in the chipset attached memory 108, and when the system 100 is still operable using the system memory 104. In one or more variations, any of one or more components of the system 100 is configured to test the chipset attached memory 108 during such an overlap, e.g., to ensure that the chipset attached memory 108 is capable of operating properly when the system memory 104 is powered down and/or otherwise taken offline. However, in at least one other variation, the chipset attached memory 108 is not tested before powering down and/or otherwise taking the system memory 104 offline.

In the illustrated example 200, operability of the system memory 104 is indicated by black bars arranged perpendicularly to the system memory 104 block whereas non-operability or a powered-down state is indicated by the white bar arranged between the black bars and perpendicular to the system memory 104 block. Similarly, operability of the chipset attached memory 108 is indicated by the black bar arranged perpendicularly to the chipset attached memory 108 block that is disposed on the dashed line extending from the chipset attached memory 108 block.

During the second phase 208 of operation, the device (and or the system 100) operates using the contents 120 from the chipset attached memory 108, e.g., rather than using the system memory 104. Thus, the chipset attached memory 108 services read/write requests previously serviced by the system memory 104 during the first phase 206 of operation. In other words, during the second phase 208, the chipset attached memory 108 services one or more of the access requests 202(b), resulting in serviced requests 204(b) while the system memory 104 is non-operable. In this example 200, the subsequent access requests 202(b) are depicted as being communicated from the memory controller 114 over the chipset link 110 to the chipset attached memory controller 116 and then to the chipset attached memory 108. By way of example, the access requests 202(b) are initiated by the processing unit 112, e.g., for executing one or more tasks of an operating system and/or application. Further, the serviced requests 204(b) are depicted being provided from the chipset attached memory 108 to the chipset attached memory controller 116 and over the chipset link 110 to the memory controller 114.

During the second phase 208 of operation, the device is operated using the contents 120 from the chipset attached memory 108 and the system memory 104 is inoperable. As discussed throughout, during this period in which the system memory 104 is inoperable, one or more physical adjustments 216 can be made to the system memory 104. In the illustrated example 200, the physical adjustments 216 are indicated being made while the system memory 104 is powered down or otherwise non-operable, e.g., as indicated by the white bar perpendicularly arranged below the system memory 104 box. Examples of physical adjustments made to the system memory 104 during this time interval are described in more detail above. In one or more implementations, the system memory 104 can be rendered inoperable for other reasons. For example, the system memory 104 may be rendered inoperable due to a system failure or corruption. In these scenarios, the contents 120 can be transferred from the system memory 104 to the chipset attached memory 108 while a system level reboot is performed.

After the physical adjustments, the contents 120 are transferred back to the system memory 104 from the chipset attached memory 108 via the chipset link 110. In one or more implementations, the system memory 104, as adjusted, is trained before the contents 120 are transferred back to the system memory 104. In one or more implementations, the chipset attached memory controller 116 receives an indication (not shown) that indicates the system memory 104 is again operable, and is thus capable of servicing read/write requests. In at least one variation, such an indication indicates to the chipset attached memory controller 116 to initiate transfer of the contents 120 back to the adjusted system memory 104. In variations, the contents 120 transferred ranges from a subset of data maintained in the system memory 104 to an entirety of the data maintained in the system memory 104. In terms of data flow, the contents 120 are transferred from the chipset attached memory 108 (e.g., over one or more memory interfaces) to the chipset attached memory controller 116, which communicates the contents 120 over the chipset link 110 to the memory controller 114 (e.g., of the processing unit package 102), and the memory controller 114 communicates the contents 120 to the system memory 104 (e.g., over one or more memory interfaces), where the contents 120 are stored. In one or more implementations, the memory controller 114 stores the contents 120 in the system memory 104 using one or more write requests.

After the contents are transferred, operation of the device (and/or the system 100) uses the contents 120 from the system memory 104. This example 200 depicts overlap 218 between when system memory 104 includes the contents 120, such that the system 100 is operable using the contents in the system memory 104, and when the system 100 is still operable using the chipset attached memory 108. In one or more variations, any of one or more components of the system 100 is configured to test or train the system memory 104 during such an overlap, e.g., to ensure that the system memory 104 is capable of operating properly when operation of the system returns to using the system memory 104 instead of using the chipset attached memory 108. However, in at least one other variation, the system memory 104 is not tested before returning operation from the chipset attached memory 108 to the system memory 104.

During the third phase 210 of operation, the device (and or the system 100) operates using the contents 120 from the system memory 104 as physically adjusted, e.g., rather than using the chipset attached memory 108. Thus, the adjusted system memory 104 services read/write requests, which were serviced by the chipset attached memory 108 during the second phase 208 of operation. In other words, during the third phase 210, the system memory 104 again services one or more of the access requests 202(c), resulting in serviced requests 204(c).

Figure 3:
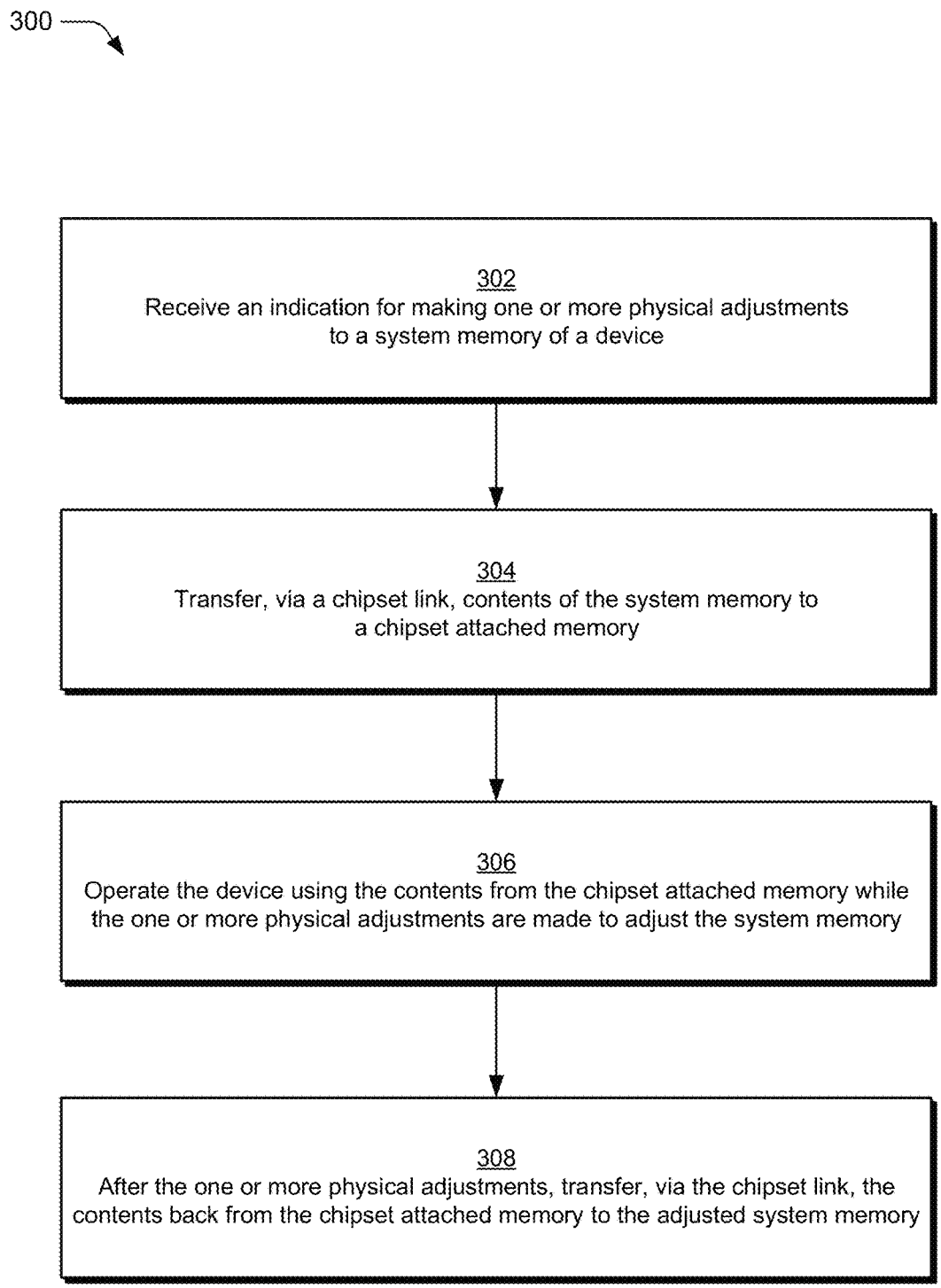
FIG. 3 depicts a procedure in an example implementation of physical adjustment to system memory with chipset attached memory.

FIG. 3 depicts a procedure in an example 300 implementation of physical adjustment to system memory with chipset attached memory.

An indication for making one or more physical adjustments to system memory of a device is received (block 302). By way of example, an indication 118 for making physical adjustments to the system memory 104 is received. In one or more implementations, the indication 118 is received responsive to user input provided via a user interface of a system- or memory-management application (not shown), being executed by the processing unit 112, and the input indicates that the user intends to physically adjust the system memory 104.

Contents of the system memory are transferred to a chipset attached memory via a chipset link (block 304). By way of example, contents 120 of the system memory 104 are transferred via the chipset link 110 to the chipset attached memory 108. Based on or responsive to receipt of the indication 118, for instance, the memory controller 114 causes the contents 120 of the system memory 104 to be transferred via the chipset link 110 to the chipset attached memory 108.

The device is operated using the contents from the chipset attached memory while the one or more physical adjustments are made to adjust the system memory (block 306). By way of example, once the contents 120 are transferred to the chipset attached memory 108, various operations are performed using the contents 120 from the chipset attached memory 108. For example, the processing unit 112 executes (and/or continues to execute) one or more tasks of an operating system and/or an application using the contents 120 from the chipset attached memory 108. Such tasks are performed using the contents 120 from the chipset attached memory 108 rather than using the contents 120 from the system memory 104. While such operations are performed using the contents 120 from the chipset attached memory 108, physical adjustments can be made to the system memory 104 because the system memory 104 is not in use, e.g., power to the system memory 104 is gated or otherwise cut.

After the one or more physical adjustments, the contents are transferred back from the chipset attached memory to the adjusted system memory via the chipset link (block 308). By way of example, after physical adjustments are made to the system memory 104, the contents 120 are transferred back from the chipset attached memory 108 to the system memory 104 via the system memory 104, which has been adjusted. Once the contents 120 are transferred back to the system memory 104, various operations are performed using the contents 120 from the system memory 104 as adjusted— rather than performing the operations using the contents 120 from the chipset attached memory 108. For example, the processing unit 112 executes (and/or resumes executing) one or more tasks of an operating system and/or an application using the contents 120 from the system memory 104.

Figure 4:
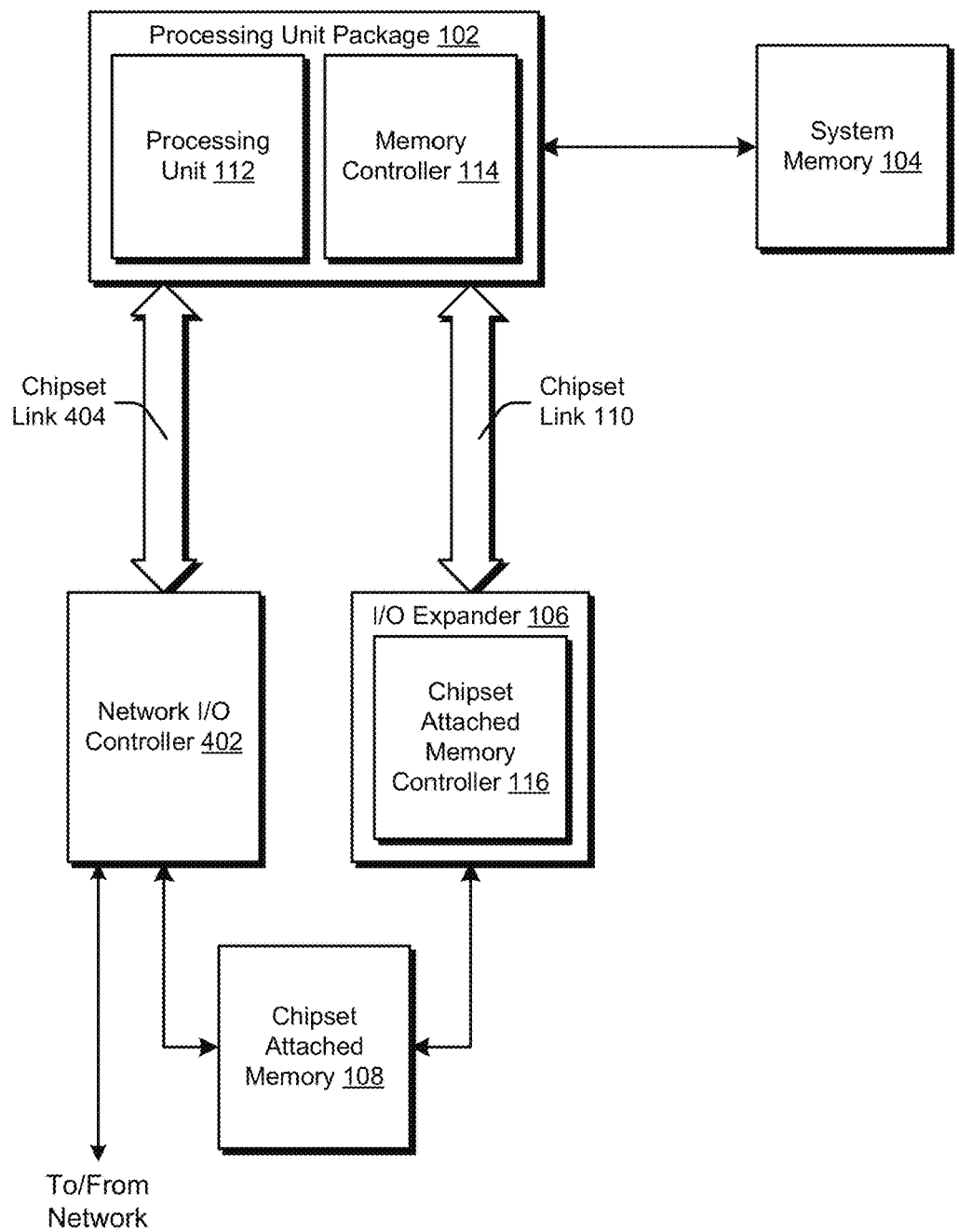
FIG. 4 is an illustration of another non-limiting example system that employs a chipset attached memory to continue operation of the system during physical adjustment of system memory.

FIG. 4 is an illustration of another non-limiting example system 400 that employs a chipset attached memory to continue operation of the system during physical adjustment of system memory. The system 400 includes the processing unit package 102, the system memory 104, the I/O expander 106, the chipset attached memory 108, and the chipset link 110 analogous to the system 100 of FIG. 1. The system 400 also includes a network I/O controller 402 and a chipset link 404 allowing the processing unit package 102 to communicate with the network I/O controller 402 using any of a variety of communication links analogous to chipset link 110.

The processing unit package 102, the system memory 104, the I/O expander 106, the chipset attached memory 108, the chipset link 110, the network I/O controller 402, and the chipset link 404 are installed on or are part of, for example, a motherboard or other printed circuit board. In one or more implementations, the I/O expander 106 (including the chipset attached memory controller 116), the chipset link 110, the chipset link 404, one or more memory channels between the processing unit package 102 and the system memory 104, and one or more memory channels between the I/O expander 106 and the chipset attached memory 108 are also referred to as a chipset of a motherboard or other printed circuit board.

The processing unit package 102 includes the processing unit 112 and the memory controller 114. Although a single processing unit 112 is illustrated in the system 400, the processing unit package 102 optionally includes any number of processing units of the same or different types, and or other types of components, such as an artificial intelligence accelerator. Given this architecture, such other optional components also access the system memory 104 directly (e.g., via the memory controller 114) or through an operating system running on the processing unit 112. Those components are also configured to access the chipset attached memory 108 (e.g., via the I/O expander 106 or the network I/O controller 402).

The network I/O controller 402 manages communication over a network, such as by sending data or control signals to one or more other devices via the network and receiving data or control signals from one or more other devices via the network. The network is implemented in any of a variety of manners, such as an Ethernet network, an InfiniBand network, and so forth. The network I/O controller 402 is also coupled or attached to the chipset attached memory 108 via one or more memory channels. In one or more implementations, the chipset attached memory 108 is address space (e.g., PCIe address space) that is addressable by other server nodes as well as components of the system 400 (e.g., the processing unit 112). The network I/O controller 402 is thus able to send read and write requests to the chipset attached memory 108 and receive responses from the chipset attached memory 108, analogous to the chipset attached memory controller 116.

In one or more implementations the chipset attached memory 108 is attached or coupled to only one of the network I/O controller 402 or the I/O expander 106 rather than attached or coupled to both the network I/O controller 402 and the I/O expander 106.

The network I/O controller 402 being attached or coupled to the chipset attached memory 108 supports various different usage scenarios. In one or more implementations, the processing unit package 102 is able to access the chipset attached memory 108 via the network I/O controller 402, allowing the chipset attached memory 108 to be used in situations where the chipset attached memory 108 is not attached or coupled to the I/O expander 106. Such situations arise, for example, where board routing limitations prevent the chipset attached memory 108 from being attached or coupled to the I/O expander 106.

In one or more implementations, the network I/O controller 402 allows the chipset attached memory 108 to be accessed by other devices via the network. This access is allowed using any of a variety of public or proprietary remote direct memory access (RDMA) techniques. For example, assume the system 400 is implemented in a server node connected to multiple other server nodes (e.g., some including their own chipset attached memory and optionally others not including their own chipset attached memory). Another server node communicates read and write requests to the chipset attached memory 108 via the network I/O controller 402 and receives responses from the chipset attached memory 108 via the network I/O controller 402. The other server node is thus able to make use of the chipset attached memory 108 without disrupting the system memory 104 or even the processing unit package 102. E.g., the processing unit package 102 need not have knowledge of the other server node accessing the chipset attached memory 108.

By way of another example, assume the system 400 is implemented in a server node connected to multiple other server nodes, at least one of which includes its own chipset attached memory. In at least one variation, the processing unit 112 (or other component of the processing unit package 102) is able to communicate read and write requests to the chipset attached memory of the other server node via the network I/O controller 402 and receive responses from the chipset attached memory of the other server node via the network I/O controller 402. The processing unit 112 or other component of the processing unit package 102 is thus able to make use of the chipset attached memory of another sever node without disrupting the system memory 104 or the chipset attached memory 108.

Figure 5:
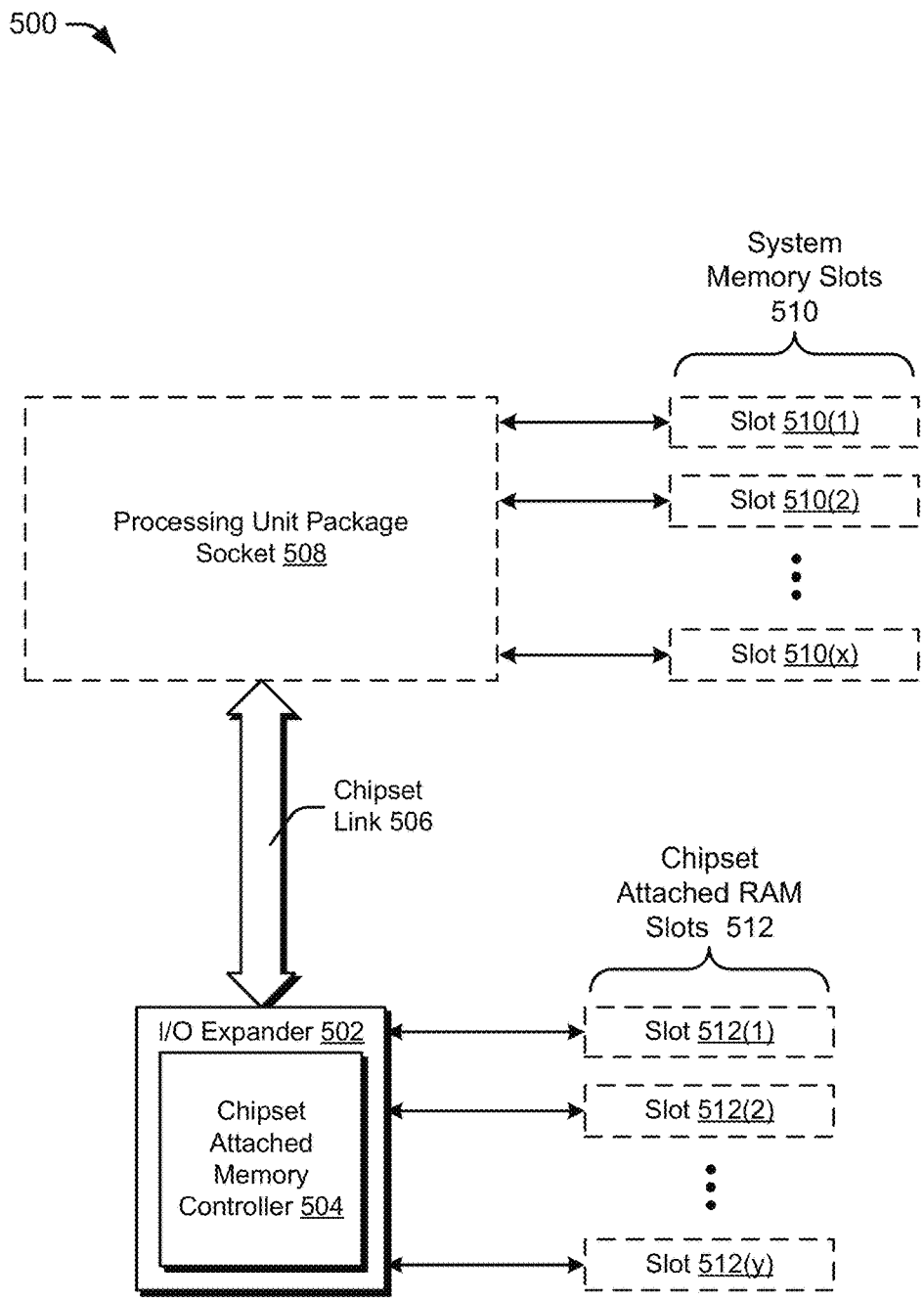
FIG. 5 is an illustration of another non-limiting example system that employs a chipset attached memory to continue operation of the system while the system memory is inoperable.

FIG. 5 is an illustration of another non-limiting example system 500 that employs a chipset attached memory to continue operation of the system while the system memory is inoperable. The system 500 is, for example, a motherboard or other printed circuit board. The system 500 includes an I/O expander 502 that includes a chipset attached memory controller 504, and a chipset link 506. The system 500 also includes a processing unit package socket 508, system memory slots 510, and chipset attached memory slots 512. The processing unit package socket 508 is designed to have a processing unit package, such as the processing unit package 102 of FIG. 1 or FIG. 4, installed or inserted therein. In one or more implementations, the I/O expander 502 (including the chipset attached memory controller 504), the chipset link 506, one or more memory channels between the processing unit package socket 508 and the system memory slots 510, and one or more memory channels between the I/O expander 502 and the chipset attached memory slots 512 are also referred to as a chipset of a motherboard or other printed circuit board. In one or more implementations, physically adjusting the system memory 104 involves removing one or more memory components from and/or inserting one or more memory components into the one or more system memory slots 512.

The I/O expander 502 is an I/O expander analogous to the I/O expander 106 of FIG. 1 or FIG. 4. The chipset attached memory controller 504 is a chipset attached memory controller analogous to the chipset attached memory controller 116 of FIG. 1 or FIG. 4. The chipset link 506 is analogous to the chipset link 110 of FIG. 1 or FIG. 4.

The system memory slots 510 include multiple ("x") memory slots 510(1), 510(2), . . . , 510(x). The system memory slots 510 are designed to have system memory, such as the system memory 104 of FIG. 1 or FIG. 4, installed or inserted therein. The system memory slots 510 are, for example, DIMM or SO-DIMM slots. Although multiple memory slots 510(1), 510(2), . . . , 510(x) are illustrated, the system 500 optionally includes a single memory slot 510 or any other number of memory slots 510.

The chipset attached memory slots 512 include multiple ("y") slots 512(1), 512(2), . . . , 512(y). The chipset attached memory slots 512 are designed to have chipset attached memory, such as the chipset attached memory 108 of FIG. 1 or FIG. 4, installed or inserted therein. The chipset attached memory slots 512 are, for example, DIMM or SO-DIMM slots. Although multiple memory slots 512(1), 512(2), . . . , 512(y) are illustrated, the system 500 optionally includes a single memory slot 512 or any other number of memory slots 512. In one or more implementations, the number of chipset attached memory slots 512 is equal to or greater than the number of system memory slots 510 of the system memory 104. In one or more implementations, if the number of chipset attached memory slots 512 is less than the number of system memory slots 510, the system may determine portions of the contents of the system memory 104 which do not need to be transferred to the chipset attached memory. In one or more implementations, multiple chipset attached memories may be attached to the system, in which case the contents of the system memory 104 can be transferred to different ones of the multiple chipset attached memories.

With a processing unit package installed or inserted in the processing unit package socket 508, system memory installed or inserted in the system memory slots 510, chipset attached memory installed or inserted in the chipset attached memory slots 512, and additional I/O devices (e.g., a chipset attached nonvolatile memory and/or a chipset attached disk drive) optionally installed or otherwise coupled to the I/O expander 502, the system 500 becomes the system 100 of FIG. 1 or a system having tiered memory options.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the processing unit package 102, the system memory 104, the chipset attached memory 108, the chipset link 110, the processing unit 112, the memory controller 114, and the chipset attached memory controller 116) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. An apparatus comprising:
   a processing unit package comprising a processing unit and a memory controller;
   a system memory coupled to the processing unit package;
   a chipset attached memory coupled to the processing unit package via a chipset link;
   the memory controller configured to:
      provide a transfer request to the system memory, the transfer request causing contents maintained by the system memory to be transferred from the system memory to the chipset attached memory, wherein the system memory is disabled after the contents is transferred to the chipset attached memory; and
      provide an additional transfer request to cause the contents to be transferred from the chipset attached memory back to the system memory; and
   the processing unit configured to execute one or more tasks using the contents from the chipset attached memory.

2. The apparatus of claim 1, wherein power to the system memory is gated to disable the system memory.

3. The apparatus of claim 2, wherein gating the system memory enables one or more physical adjustments to be made to the system memory while the processing unit executes the one or more tasks using the contents from the chipset attached memory, wherein the one or more physical adjustments that can be made to the system memory include one or more of swapping a physical component of the system memory, removing a physical component of the physical memory, or replacing a physical component of the physical memory.

4. The apparatus of claim 3, wherein the physical component comprises a dual in-line memory module.

5. The apparatus of claim 1, wherein the memory controller is configured to provide the transfer request responsive to receiving an indication that one or more physical adjustments are going to be made to the system memory.

6. A method comprising:
   receiving an indication for making one or more physical adjustments to a system memory of a device, the system memory coupled to a processing unit of the device and a chipset attached memory coupled to the processing unit of the device via a chipset link;
   responsive to the indication, transferring, via the chipset link, contents of the system memory to the chipset attached memory;
   disabling the system memory after the contents is transferred to the chipset attached memory;
   while the system memory is disabled, operating the device using the contents from the chipset attached memory; and
   transferring, via the chipset link, the contents back from the chipset attached memory to the system memory after the one or more physical adjustments are made to the system memory.

7. The method of claim 6, wherein disabling the system memory comprises cutting power to the system memory while the one or more physical adjustments are made to adjust the system memory.

8. The method of claim 6, further comprising operating the device using the contents from the adjusted system memory after the contents are transferred back from the chipset attached memory.

9. The method of claim 6, further comprising operating the device using the contents from the system memory before the contents are transferred to the chipset attached memory.

10. The method of claim 6, wherein the one or more physical adjustments include one or more of swapping a physical component of the system memory, removing a physical component of the physical memory, or replacing a physical component of the physical memory.

11. The method of claim 10, wherein the physical component comprises a physical memory module.

12. The method of claim 11, wherein the physical memory module comprises a dual in-line memory module.

13. The method of claim 6, further comprising training the adjusted physical memory before transferring the contents back from the chipset attached memory to the adjusted system memory.

14. A system comprising:
   a processing unit package comprising a processing unit and a memory controller;
   system memory slots into which system memory is installable, the system memory slots coupled to the processing unit package;
   a chipset attached memory coupled to the processing unit package via a chipset link;
   the memory controller configured to cause contents stored in the system memory to be transferred to the chipset attached memory; and
   a processing unit configured to execute one or more tasks using the contents from the chipset attached memory while one or more system memory components are added or removed from one or more of the system memory slots.

15. The system of claim 14, wherein the one or more system memory components include one or more physical memory modules.

16. The system of claim 14, wherein the one or more system memory components include one or more dual in-line memory modules.

17. The system of claim 14, wherein the memory controller is further configured to cause the contents to be transferred from the chipset attached memory back to the system memory.

18. The apparatus of claim 1, further comprising an I/O expander that includes a chipset attached memory controller, wherein the chipset link couples the processing unit package to the I/O expander, and wherein the chipset attached memory is coupled to the I/O expander.

19. The apparatus of claim 1, wherein the processing unit is configured to execute tasks using contents maintained by the chipset attached memory prior to transferring the contents to the chipset attached memory, wherein the contents maintained by the system memory is not maintained by the chipset attached memory prior to transferring the contents to the chipset attached memory.

* * * * *